United States Patent [19]

Baran et al.

[11] 3,755,301

[45] Aug. 28, 1973

[54] MANUFACTURE OF 11-ALKYL STEROIDS

[75] Inventors: John S. Baran, Winnetka; Chi-Dean Liang, Glenview, both of Ill.

[73] Assignee: G. D. Searle & Co., Chicago, Ill.

[22] Filed: June 23, 1972

[21] Appl. No.: 265,802

[52] U.S. Cl.. 260/239.55 R, 260/397.45, 260/397.5
[51] Int. Cl............................................ C07c 173/00
[58] Field of Search ........... Machine Search Steroids

[56] References Cited
OTHER PUBLICATIONS
Kirk–Steroid Reaction Mechanisms, p. 356 & 357. (1968).

*Primary Examiner*—Henry A. French
*Attorney*—John M. Brown, Elliot N. Schubert et al.

[57] ABSTRACT

11$\beta$-Alkyl steroids are advantageously produced from 11-keto-9$\beta$-estra-1,3,5(10)-triene-3,17$\beta$-diol, which compound is obtained, typically, by rearrangement of 9$\alpha$, 11$\alpha$-epoxyestra-1,3,5(10)-triene-3,17$\beta$-diol or an acylated derivative thereof.

4 Claims, No Drawings

MANUFACTURE OF 11-ALKYL STEROIDS

The present invention involves a novel process and novel intermediates for the manufacture of 11β-alkyl steroids of the following structural formula

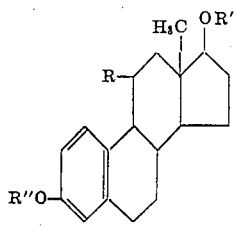

wherein R is a lower alkyl radical and R' and R'' can be hydrogen or a lower alkanoyl radical.

The lower alkyl radicals denoted in the foregoing structural formula are typified by methyl, ethyl, propyl, butyl, pentyl, hexyl, heptyl, and the corresponding branched-chain isomers.

The lower alkanoyl radicals depicted in that representation are typified by formyl, acetyl, propionyl, butyryl, valeryl, caproyl, heptanoyl, and the branched-chain radicals isomeric therewith.

The novel process of the present invention comprises the reaction of a compound of the following structural formula

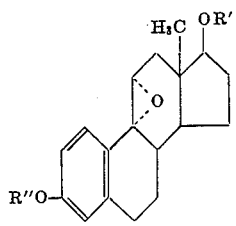

wherein R' and R'' are as indicated hereinbefore, with a reagent capable of hydrolyzing the phenolic ester group, thus affording 11-keto-9β-estra-1,3,5(10)-triene-3,17β-diol. Suitable reagents for this purpose are exemplified by alkali metal hydroxides, alkaline earth metal hydroxides, alkali metal salts, alkaline earth metal salts, mineral acids and other inorganic acids and organic acids. The essential feature of this process, when an alkaline reagent is used, is the generation of an anion at the 3-position. The use of an alkaline reagent is preferred in that it leads to higher yields of the desired product.

Alkali metal hydroxides are ememplified by sodium and potassium hydroxides; alkaline earth metal hydroxides by calcium and barium hydroxide; alkaline metal salts by sodium carbonate, potassium carbonate and sodium acetate; alkaline earth metal salts by calcium acetate and barium acetate; mineral acids by hydrochloric and hydrobromic acid; other inorganic acids by phosphoric and sulfauric acid; and organic acids by oxalic and p-toluenesulfonic acid.

A specific example of this process is shown by the reaction of 9α,11α-epoxyestra-1,3,5(10)-triene-3,17β-diol diacetate with aqueous potassium hydroxide in methanol to afford 11-keto-9β-estra-1,3,5(10)-triene-3,17β-diol.

The novel intermediates of this invention are useful in the production of known and useful 11-alkyl steroids. By procedures exemplified hereinafter, 11-keto-9β-estra-1,3,5(10)-triene-3,17β-diol is converted to 11β-alkylestra-1,3,5(10)-triene-3,17β-diol and the ethers and esters thereof described in U.S Pat. No. 3,377,365. As noted there, those substances are potent estrogenic materials.

The aforementioned processes for production of known and useful 11-alkyl steroids are exemplified by the following series of reactions. 11-Keto-9β-estra-1,3,5(10)-triene-3,17β-diol is converted to the 3-benzyl ether by reaction with benzyl chloride in the presence of potassium bicarbonate; that benzyl ether is allowed to react with ethereal allyl magnesium bromide and the resulting adduct is hydrolyzed to afford 11α-allyl-9β-estra-1,3,5(10)-triene-3,11β,17-triol 3-benzyl ether; the latter compound is acetylated with acetic anhydride in pyridine to afford the corresponding 17-acetate; that 17-acetate is dehydrated by means of thionyl chloride in pyridine to produce 11-allylestra-1,3,5(10),9(11)-tetraene-3,17β-diol 3-benzyl ether, 17-acetate; the latter substance is hydrogenated in the presence of palladium-on-carbon catalyst to afford 11-β-propylestra-1,3,5(10)-triene-3,17β-diol 17-acetate; and the latter acetate is hydrolyzed by means of potassium hydroxide in methanol to produce the desired 11-β-propylestra-1,3,5(10)-triene-3,17β-diol.

An alternate procedure for manufacture of the aforementioned 11-alkyl steroids is exemplified by hydrogenation of the above-described 11α-allyl-9β-estra-1,3,5(10)-triene-3,11β,17β-triol 3-benzyl ether, 17-acetate, thus affording 11α-propyl-9β-estra-1,3,5(10)-triene-3,11β,17β-triol 17-acetate; conversion of that ester to the corresponding 3-benzyl ether by reaction with benzyl chloride in the presence of potassium bicarbonate; dehydration of the latter substance with thionyl chloride in pyridine to yield 11-propylestra-1,3,5(10),9(11)-tetraene-3,17β-diol 3-benzyl ether, 17-acetate; hydrogenation to yield 11β-propylestra-1,3,5(10)-triene-3,17β-diol 17-acetate and hydrolysis of the ester group, typically with potassium hydroxide in methanol, to afford 11β-propylestra-1,3,5(10)-triene-3,17β-diol.

The aforementioned novel intermediates are useful in consequence of their valuable pharmacological properties. They exhibit, for example, endocrine properties as exemplified by their anti-fertility and estrogenic activity. In addition, they display a favorable antifertility/estrogenic ratio as compared to related prior art compositions.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees Centigrade (°C.) and quantities and materials and parts by weight unless otherwise noted.

EXAMPLE 1

A solution consisting of 5 parts of 3-hydroxyestra-1,3,5(10)-triene-17-one dissolved in 125 parts by volume of pentane is stirred and cooled to −20°. To that solution, in a nitrogen atmosphere, is added successively 25 parts by volume of fluorosulfonic acid and, portionwise, 5 parts of adamantanol. That reaction mixture is stirred for about 10 minutes, at the end of which time the organic layer is separated by decantation. The residual thick oily material is poured carefully into ice water and the resulting aquous mixture is extracted several times with dichloromethane. The combined extracts are washed with saturated aqueous sodium bicarbonate, then dried over anhydrous sodium sulfate. Evaporation of th solvent under reduced pressure affords a residue, which is purified by recrystallization from acetone, thus yielding 3-hydroxyestra-1,3,5(10),9(11)-tetraen-17-one, melting at about 252°–257°.

EXAMPLE 2

A mixture containing 3 parts of 3-hydroxyestra-1,3,5(10),9(11)-tetraen-17-one, 0.4 part of sodium borohydride and 75 parts by volume of ethanol is heated at the reflux temperature for about 3 minutes, then is stirred at room temperature for about 4 hours. To that mixture is then added dropwise, at 0° an excess of 10% aqueous acetic acid. The solvent is evaporated and the residual material is extracted with ether. The ether extracts are combined, washed successively with water, saturated aqueous sodium bicarbonate and water until neutral, then concentrated to dryness under reduced pressure to afford estra-1,3,5(10),9(11)-tetraene-3,17β-diol.

EXAMPLE 3

A solution containing 3 parts of estra-1,3,5(10),9(11)-tetraene-3,17β-diol, 18 parts of pyridine and 15 parts of acetic anhydride is stirred at room temperature for about 16 hours, then is poured carefully into ice water. To that aqueous mixture is added 50 parts by volume of ether and the resulting extract is washed successively with water, saturated aqueous sodium bi-carbonate and water until neutral, then stripped of solvent under reduced pressure, thus affording estra-1,3,5(10),9(11)-tetraene-3,17β-diol diacetate.

EXAMPLE 4

A solution consisting of 2 parts of estra-1,3,5(10),9-(11)-tetraene-3,17β-diol diacetate dissolved in 20 parts by volume of chloroform is cooled to approximately 0° and a solution containing 2 parts of m-chloroperbenzoic acid dissolved in 20 parts of chloroform is added dropwise with cooling to approximately 5°. The resulting reaction mixture is stirred at 0° for approximately 4 hours, then is washed successively with saturated aqueous sodium bicarbonate and water. Drying of that solution over anhydrous sodium sulfate followed by removal of the solvent by distillation under reduced pressure affords a solid residue, which is purified by recrystallization from hexane, thus affording 9α,11α-epoxyestra-1,3,5(10)-triene-3,17β-diol diacetate, melting at about 129°–130°. It is represented by the following structural formula

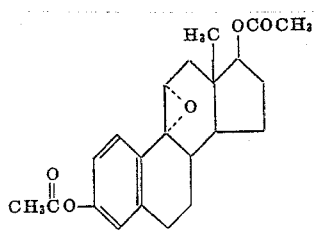

EXAMPLE 5

A solution containing 5 parts of 9α,11α-epoxyestra-1,3,5(10)-triene-3,17β-diol 9α,11α-epoxyestra-1,3,5(10)-triene-3,17β-diol 500 parts by volume of 5 percent aqueous potassium hydroxide dissolved in 500 parts by volume of methanol is heated at the reflux temperature for about 30 minutes, then is cooled and neutralized by the careful addition of acetic acid. Concentration of that solution to approximately one-half volume followed by extraction with ether affords an organic solution, which is stripped of solvent under reduced pressure to afford the crude product. That material is then heated with 100 parts by volume of benzene, cooled and concentrated to dryness under reduced pressure to afford 11-keto-9β-estra-1,3,5(10)-triene-3,17β-diol, melting at about 238°–240°. This compound is represented by the following structural formula

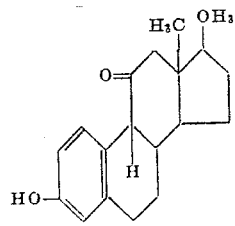

EXAMPLE 6

A mixture containing 5 parts of 11-keto-9β-estra-1,3,5(10)-triene-3,17β-diol, 2.4 parts of benzyl chloride, 4.8 parts of potassium bicarbonate and 180 parts by volume of methanol is heated at the reflux temperature for about 24 hours, at the end of which time the solvent is removed by evaporation under reduced pressure and the residual material is extracted with benzene. The benzene extracts are combined, then washed successively with water and aqueous sodium bicarbonate until neutral. Removal of the solvent under reduced pressure affords a residue, which is purified by recrystallization from methanol to yield 11-keto-9β-estra-1,3,5(10)-triene-3,17β-diol 3-benzyl ether, melting at about 159°–160°.

EXAMPLE 7

To a solution of 1 part of 11-keto-9β-estra-1,3,5(10)-triene-3,17β-diol 3-benzyl ether dissolved in 10 parts by volume of tetrahydrofuran is added 3 parts by volume of ethereal allyl magnesium bromide with stirring at 0° for about 1 hour. At the end of that time the mixture is neutralized, at 0° with an equivalent amount of acetic acid, then is stirred for about 30 minutes. Three parts by volume of ehtereal allyl magnesium bromide is added at 0° and the reaction mixture is again stirred for 1 hour, then neutralized by means of the addition of acetic acid. The addition and neutralization procedures are repeated twice more. A further additional equivalent of ethereal allyl magnesium bromide is then added and stirring is continued at room temperature for about 16 hours. The mixture is cooled to 0° and neutralized by the addition of aqueous ammonium chloride, then extracted with ether. The ether solution is washed successively with water and aqueous sodium bicarbonate until neutral. Evaporation of the solvent under reduced pressure followed by recrystallization of the resulting crude product from methanol affords 11α-allyl-9β-estra-1,3,5(10)-triene-3,11β,17β-triol 3-benzyl ether.

EXAMPLE 8

A mixture consisting of 0.2 part of 11-allyl-1β-estra-1,3,5(10)-triene-3,11,17β-triol 3-benzyl ether, 0.6 part by volume of pyridine and 0.5 part by volume of acetic anhydride is stirred for about 16 hours at room temperature, then is poured carefully into a mixture of ice and water. The resulting aqueous mixture is extracted with ether, then dried over anhydrous sodium sulfate. Evaporation of the ether under reduced pressure affords 11-β-allyl-9β-estra-1,3,5(10)-triene-3,11β,17β-triol 3-benzyl ether, 17-acetate.

EXAMPLE 9

To a solution containing 9.12 parts of thionyl chloride and 1 part by volume of pyridine is added, at −15° over a period of about 30 minutes, a solution containing 0.2 part of 11α-allyl-9β-estra-1,3,5(10)-triene-3,11β,17β-triol 3-benzyl ether, 17-acetate dissolved in 2 parts of pyridine. The reaction mixture is allowed to warm gradually to room temperature, then is cooled to 0° and diluted with approximately 25 parts by volume of chloroform containing a small quantity of ethanol. That mixture is washed successively with water, aqueous sodium bicarbonate and water until neutral, then is dried over anhydrous sodium sulfate and stripped of solvent to produce 11-allylestra-1,3,5(10),9(11)-tetraene-3,17β-diol 3-benzyl ether, 17-acetate.

EXAMPLE 10

A mixture containing 2 parts of 11-allylestra-1,3,5(10),9(11)-tetraene-3,17β-diol 3-benzyl ether, 17-acetate, 1 part of 10 percent palladium-on-charcoal catalyst and 50 parts of tetrahydrofuran is shaken with hydrogen at room temperature and atmospheric pressure until three molecular equivalents of hydrogen are absorbed. The catalyst is removed by filtration and the filtrate is concentrated to dryness to afford the crude product. Purification by chromatography on silica gel followed by elution with 10 percent ethyl acetate in benzene affords, as an oil, 11β-propylestra-1,3,5(10)-triene-3,17β-diol 17-acetate.

EXAMPLE 11

A mixture containing 3.5 parts of 11β-propylestra-1,3,5(10)-triene-3,17β-diol 17-acetate, 0.5 part of potassium hydroxide and 40 parts by volume of methanol is heated at the reflux temperature for about 30 minutes, at the end of which time the solvent is removed by distillation under reduced pressure. Extraction of the resulting residue with chloroform affords an organic solution, which is concentrated to dryness under reduced pressure. The resulting residue is purified by chromatography on silica gel using benzene-ethyl acetate mixtures as eluting solvents, thus producing 11β-propylestra-1,3,5(10)-triene-3,17β-diol, melting at 184°–185°.

What is claimed is:

1. A process for the manufacture of 11-keto-9β-estra-1,3,5(10)-triene-3,17β-diol which comprises contacting a compound of the formula

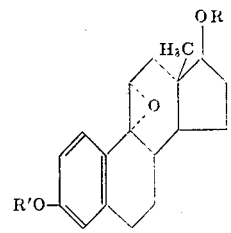

wherein R and R' are hydrogen or a lower alkanoyl radical, with a reagent capable of cleaving the 9α,11α-epoxy group.

2. The process of the claim 1, wherein 9 α diacetate is contacted with aqueous potassium hydroxide in methanol.

3. 11-Keto-9β-estra-1,3,5(10)-triene-3,17β-diol.

4. 9α,11α-epoxyestra-1,3,5(10)-triene-3,17β-diol diacetate.

* * * * *

UNITED STATES PATENT OFFICE
CERTIFICATE OF CORRECTION

Patent No. 3,755,301  Dated August 28, 1973

Inventor(s) John S. Baran and Chi-Dean Liang

It is certified that error appears in the above-identified patent and that said Letters Patent are hereby corrected as shown below:

Column 1, line 52, "ememplified" should be -- exemplified --.

Column 1, line 59, "sulfauric" should be -- sulfuric --.

Column 3, line 7, "th" should be -- the --.

Column 3, line 34, "resulting extract" should be -- resulting ether extract --.

Column 4, lines 3-4, "diol 9α,11α-epoxyestra-1,3,5(10)-triene-3,17β-diol 500" should be -- diol diacetate and 500 --.

Column 4, first formula, "$OH_3$" should be -- OH --.

Column 4, line 57, "ehtereal" should be -- ethereal --.

Column 5, line 8, "1β" should be -- 9β --.

Column 5, line 16, "β-allyl" should be -- α-allyl --.

Column 6, line 38, "9αdiacetate" should be -- 9α,11α-epoxyestra-1,3,5(10)-triene-3,17β-diol diacetate --.

Signed and sealed this 11th day of June 1974.

(SEAL)
Attest:

EDWARD M. FLETCHER, JR.
Attesting Officer

C. MARSHALL DANN
Commissioner of Patents